United States Patent [19]

Spencer, Jr.

[11] 3,898,632

[45] Aug. 5, 1975

[54] SEMICONDUCTOR BLOCK-ORIENTED READ/WRITE MEMORY

[75] Inventor: Ralph F. Spencer, Jr., Carlisle, Mass.

[73] Assignee: Sperry Rand Corporation, New York, N.Y.

[22] Filed: July 15, 1974

[21] Appl. No.: 488,628

[52] U.S. Cl. .............................. 340/173 R; 307/238

[51] Int. Cl. .............................................. G11c 11/40

[58] Field of Search .......... 340/173 R; 307/238, 279

[56] References Cited

UNITED STATES PATENTS

| | | | |
|---|---|---|---|
| 3,549,911 | 12/1970 | Scott | 340/173 R |
| 3,763,480 | 10/1973 | Weimer | 340/173 R |

*Primary Examiner*—Terrell W. Fears

*Attorney, Agent, or Firm*—Howard P. Terry; Joseph M. Roehl

[57] ABSTRACT

A block oriented read/write memory (BORAM) employs a known type of variable threshold insulated gate field effect transistor memory cells. The memory cells are arranged on a common substrate in an array of horizontal block rows and vertical word columns. A block decoder selects one block row for a given operation in which information is simultaneously read out of, or written into, each memory transistor in the selected block from a parallel/serial shift register. Information is multiplexed into or out of the shift register in serial fashion while the memory transistors are being subjected to a four-phase operating sequence utilizing a "channel shielding" technique.

6 Claims, 6 Drawing Figures

SEMICONDUCTOR BLOCK-ORIENTED READ/WRITE MEMORY

BACKGROUND OF THE INVENTION

1. Field of the Invention

The invention relates to computer memory circuits and more specifically to computer memory circuits employing variable threshold insulated gate field effect transistors as memory cells.

2. Description of the Prior Art

U.S. Pat. No. 3,508,211 entitled, "Electrically Alterable Non-Destructive Readout Field Effect Transistor Memory" and U.S. Pat. No. 3,590,337 entitled, "Plural Dielectric Layered Electrically alterable Non-Destructive Readout Memory Element" issued to H.A.R. Wegener and assigned to the present assignee, relate to varieties of variable threshold insulated gate field effect transistors useful as memory elements. The conduction threshold of these transistors is electrically alterable by impressing a binary voltage between the gate electrode and the substrate in excess of a predetermined finite magnitude. The polarity of the voltage determines the sense in which the threshold is varied. Upon the application to the gate electrode of a fixed interrogation voltage having a value intermediate the binary valued conduction thresholds, the binary condition of the transistor can be sensed by monitoring the magnitude of the resultant source-drain current. The magnitude of the interrogation voltage is insufficient to change the preexisting conduction threshold so that non-destructive readout is achieved.

Furthermore, memory circuits employing BORAMs have been previously designed as a means of reducing the expense of randomly accessed read/write memories and as a means of achieving faster read and write times.

The present invention provides a system in which the benefits of BORAM memory organization can be realized without sacrificing the advantages of MIS technology.

SUMMARY OF THE INVENTION

The present invention provides means for multiplexing the input and output operations of a BORAM memory so that the operating sequence of such a memory circuit can be reconciled with the operating sequence of variable threshold insulated gate field effect transistor memory cells.

DESCRIPTION OF THE PREFERRED EMBODIMENT

Figure 1:
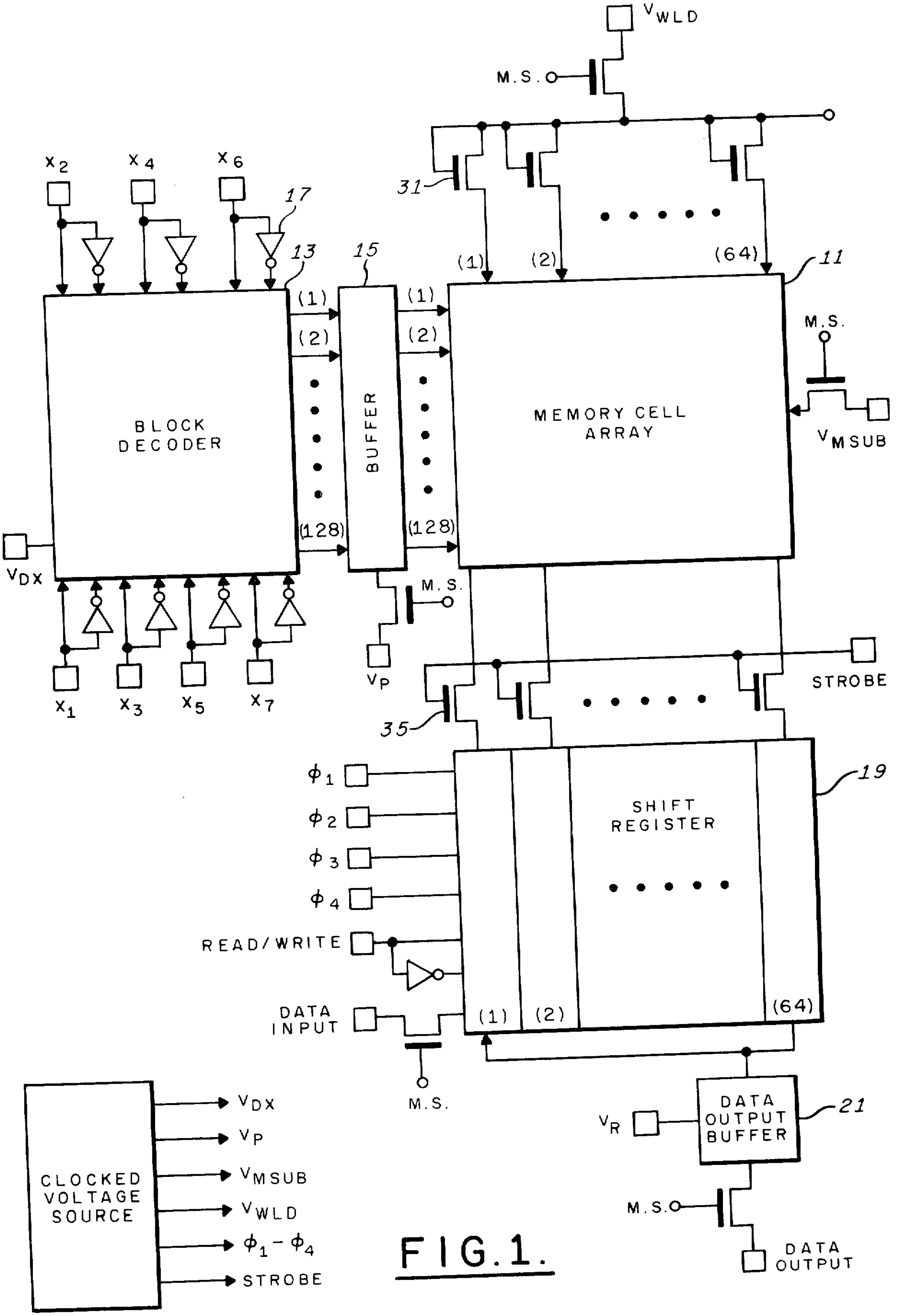
FIG. 1 is a diagram illustrating the organization of components used in a single BORAM in accordance with the principles of the invention.

In accordance with the principles of the present invention, the components associated with a single BORAM unit are arranged as shown in FIG. 1. The variable threshold transistors are arranged in an array of memory cells 11. Typically, such an array may contain 128 horizontal block rows and 64 vertical word columns.

A particular block of memory cells is selected by a block decoder 13 operating through a buffer circuit 15 in accordance with address instructions received on the terminals $X_1$–$X_7$. As presently preferred, the complements of the received address signals may be formed by address inverters such as the inverter 17 so as to provide 2-rail address signals suitable for use in a conventional NOR gate or NAND gate switching matrix in the block decoder according to well known techniques.

During a READ cycle, individual bits of information stored in the memory cells in a given block may be simultaneously strobed into a shift register 19 in response to a READ command signal. This information may then be serially read out of the shift register and into a data output buffer 21 in response to timing signals $\phi_1 - \phi_4$. The information read out of the shift register is also recirculated through the stages of the shift register so that it may be later used to refresh the various memory cells.

Conversely, during a WRITE cycle, individual bits of information may be serially entered into the shift register through the data input terminal in response to a WRITE command signal and then simultaneously strobed into the memory cells in the selected block.

At the same time that inforation is being read out of the shift register during the READ mode, each memory transistor in the memory cells of the selected block is being subjected to a sequence of voltages which prepares these memory transistors for the reception of a REWRITE (refresh) signal from the shift register.

Similarly, while information is being serially entered into the shift register during the WRITE mode, the memory transistors in the selected block line are being subjected to a sequence of operating voltages which prepares these transistors for the reception of the new data.

Figure 2:
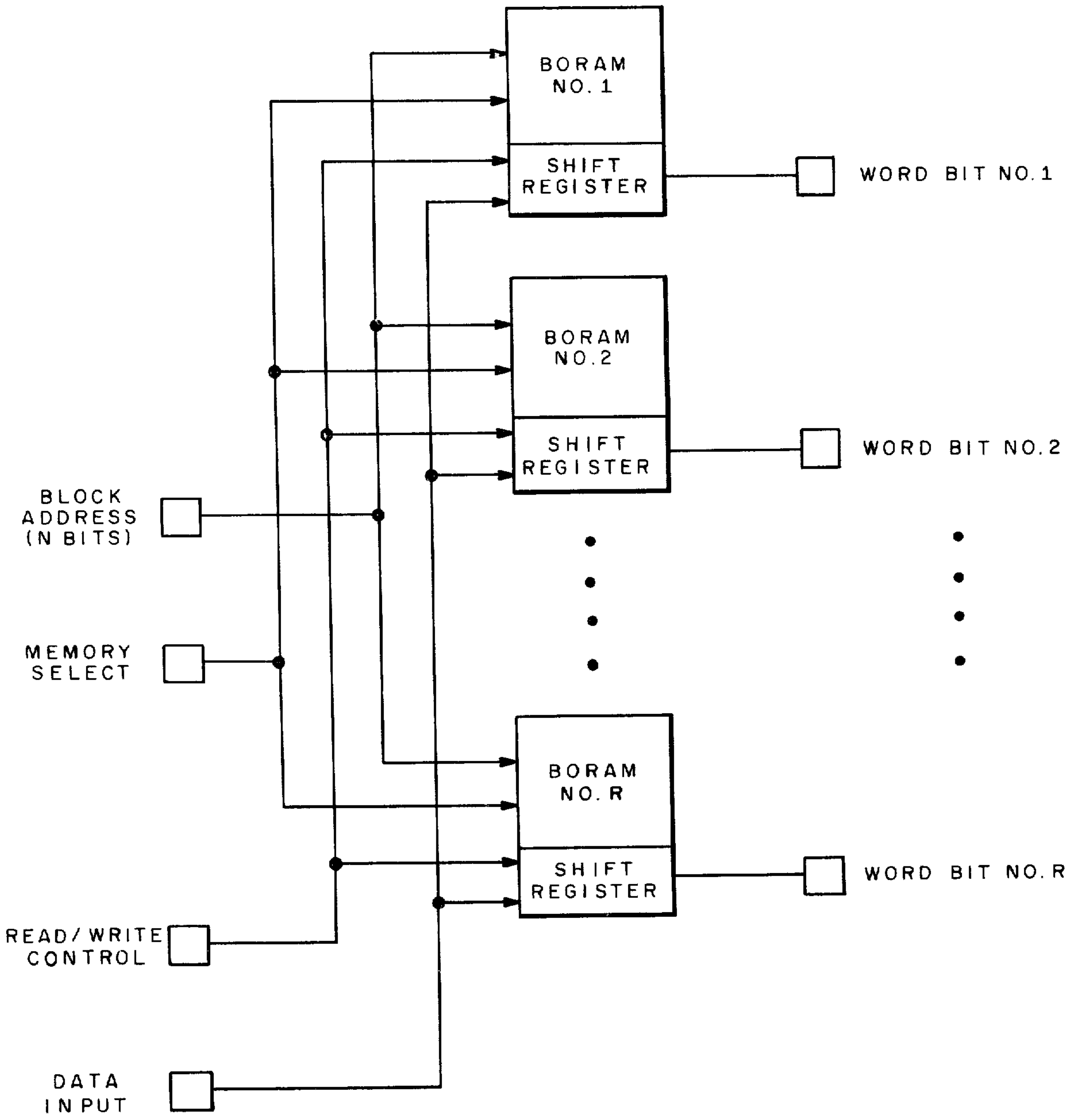
FIG. 2 is a block diagram illustrating the manner in which a number of BORAMs may be used in a memory system.

The need for various features embodied in the BORAM unit of FIG. 1 can be appreciated by referring to FIG. 2 which illustrates the use of a number of BORAMs in a typical main frame memory system. As can be seen from FIG. 2, such a system employs a number of BORAM units equal to the number of bits in a word to be processed. In general, if each BORAM unit contains $2^n$ block rows and m words per block, $2^n$ different sequences of $m$ words, each containing R bits may be stored in the memory of FIG. 2.

The BORAM concept was developed principally to provide read and write times that were faster than those that could be achieved with randomly accessed read/write memories. In a memory system context, the system access time is the sum of the propagation delay between the central processing unit and the memory plus the access time of the memory itself. As main memory access times become lower in value, the propagation delay between the associated central processing unit and the memory becomes an increasingly large percentage of the system access time. A block oriented memory circumvents this time barrier by requiring the central processing unit to handle blocks of words instead of one word. In the BORAM configuration, the propagation time between the central processing unit and the memory is averaged out over all the words contained in a block. Although a block memory requires that the central processing unit must have a local memory to store the blocks of words obtained from the main memory, the speed of the local memory is much greater than that of the BORAM so that a net time reduction is available.

Reading and writing with the BORAM main frame memory requires that each time the memory is addressed by the central processing unit, $m$ words are transferred between the main memory and the local memory in a predetermined sequence.

Thus, for example, if the system of FIG. 2 used BORAMs of the type depicted in FIG. 1, the memory system could store $2^7$ or 128 different sequences. Each sequence would contain 64 R bit words.

Figure 3:
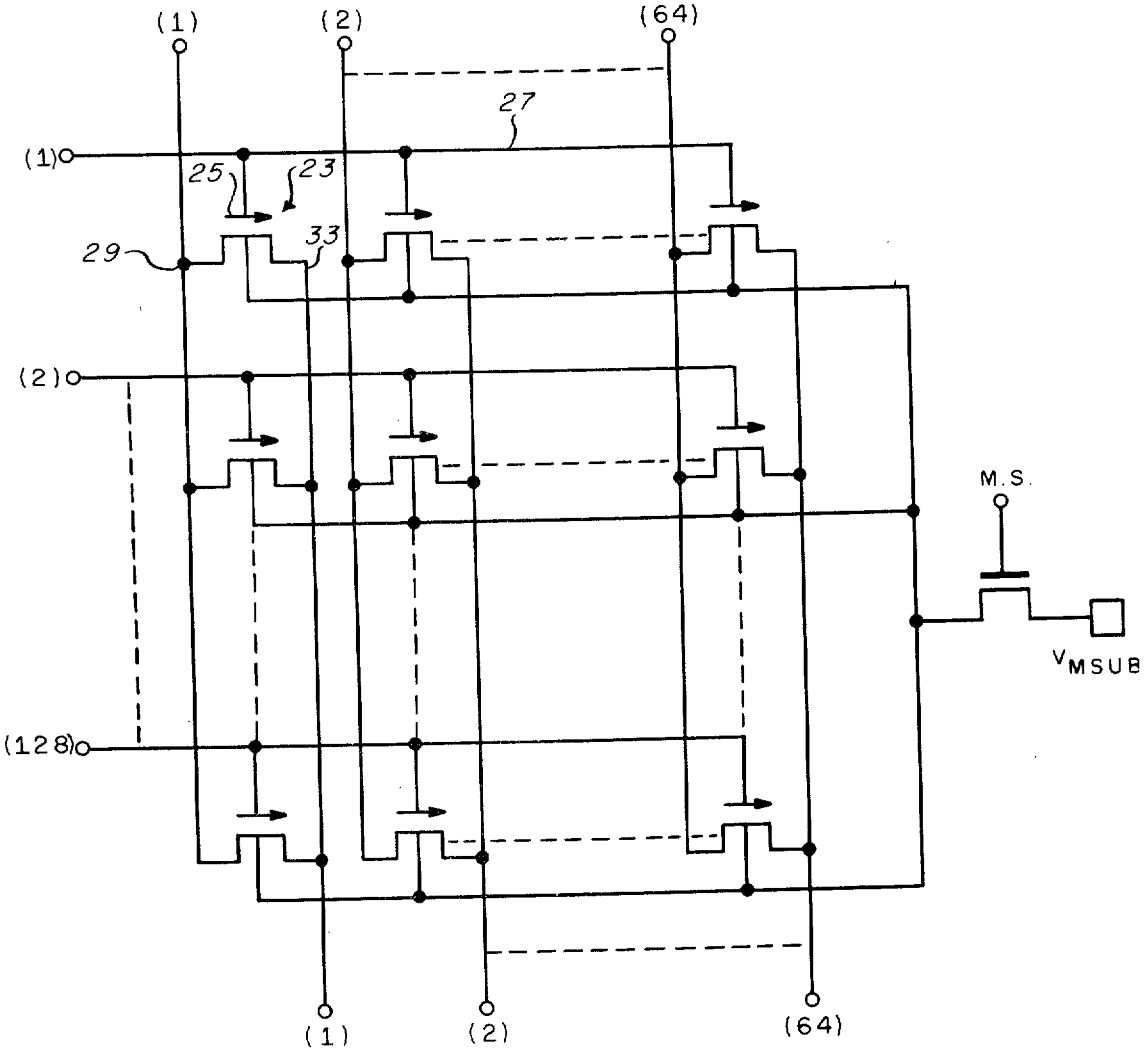
FIG. 3 is a circuit diagram illustrating the manner in which an array of variable threshold insulated gate field effect transistors may be connected in practicing the invention.

According to the principles of the present invention, the memory cell array 11 may be constructed as indicated in FIG. 3 wherein 128 horizontal block rows of memory transistors are arrayed in 64 vertical word columns on a common substrate.

Suitable voltages $V_{MSUB}$ are applied to the common substrate in response to a memory select MS signal.

Each memory transistor such as the transistor 23 includes a gate electrode 25 connected through a block line 27 to the gate electrodes of all memory transistors in the same block. Each block line is coupled to the corresponding output terminal of the buffer 15 (FIG. 1).

Each memory transistor also contains a drain electrode 29 connected through a common drain line to all memory transistors in the same vertical word column and through a word line precharge transistor driver 31 (FIG. 1) to a source of word line driver voltages $V_{WLD}$.

Each memory transistor further contains a source electrode 33 which is connected through a common source line to the source electrodes of all memory transistors in the same vertical word line and through a strobe transistor 35 (FIG. 1) to a corresponding stage in the shift register 19.

After the decoder 13 has received an address signal $X_1$–$X_7$, a decoder control voltage $V_{DX}$ will cause an enabling voltage to appear on the decoder output line corresponding to the received address signal.

The buffer 15 is a straightforward circuit containing individual switching transistors corresponding to each block row in the memory array. Each of these transistors is connected to apply a buffer clock voltage $V_P$ to the gate electrodes of the memory transistors in the associated block in response to an enabling signal on the corresponding output line from the decoder.

As explained in the aforementioned patents to H.A.R. Wegener, information is stored in the memory transistors as either a high or low conduction threshold voltage. Assuming that P-channel direct shifting transistors are used, a negative gate-substrate WRITE voltage will shift the threshold voltage to its high (negative) value, whereas a positive gate-substrate WRITE voltage will shift the threshold to its low (positive) value. Thus, gate-substrate voltages of both polarities must be applied to the memory transistors. The buffer circuit provides a convenient means of applying voltages of either polarity to the gate electrodes in accordance with the polarity of the buffer clock voltage $V_P$.

The shift register 19 is a parallel/serial device containing a stage corresponding to each vertical word column in the memory array. Each stage of the shift register may be simultaneously connected or disconnected to the common source line of the corresponding word column through a strobe transistor such as the transistor 35 in response to a strobe voltage. The shift register is a 4-phase dynamic shift register having 64 stages and being capable of recirculating data when needed during the READ mode. The construction of a typical shift register is indicated in greater detail in FIG. 4.

Figure 4:
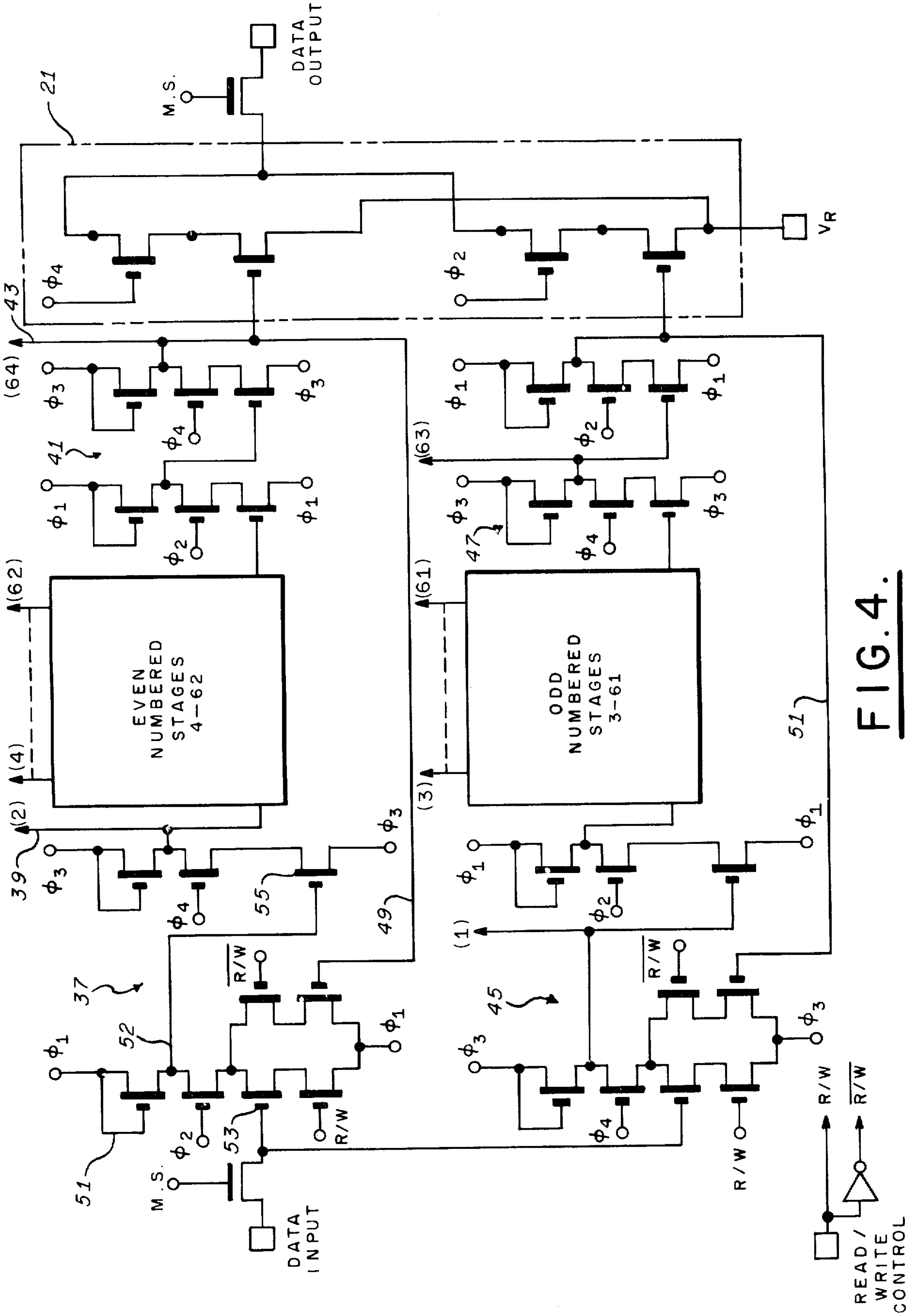
FIG. 4 is a diagram illustrating a shift register useful in practicing the invention.

FIG. 4 shows details of typical stages in the shift register and illustrates how multiplexing may be used to double the speed at which information may be clocked through the register.

It will be noticed that the register stages are segregated into two groups: One group comprising the even-numbered stages and the other group comprising the odd-numbered stages.

Each stage is coupled to the common source line in the corresponding word column as indicated in FIG. 4. Thus register stage 37 is coupled to word column 2 through a source coupling lead 39, and register stage 41 is coupled to word column 64 through a source coupling lead 43. Similarly, register stage 45 is coupled to vertical word column 1 and register stage 47 is coupled to vertical word column 63. Intermediate stages in the upper and lower groups are coupled to the remaining even-numbered and odd-numbered word columns respectively, as indicated in FIG. 4.

Figure 5:
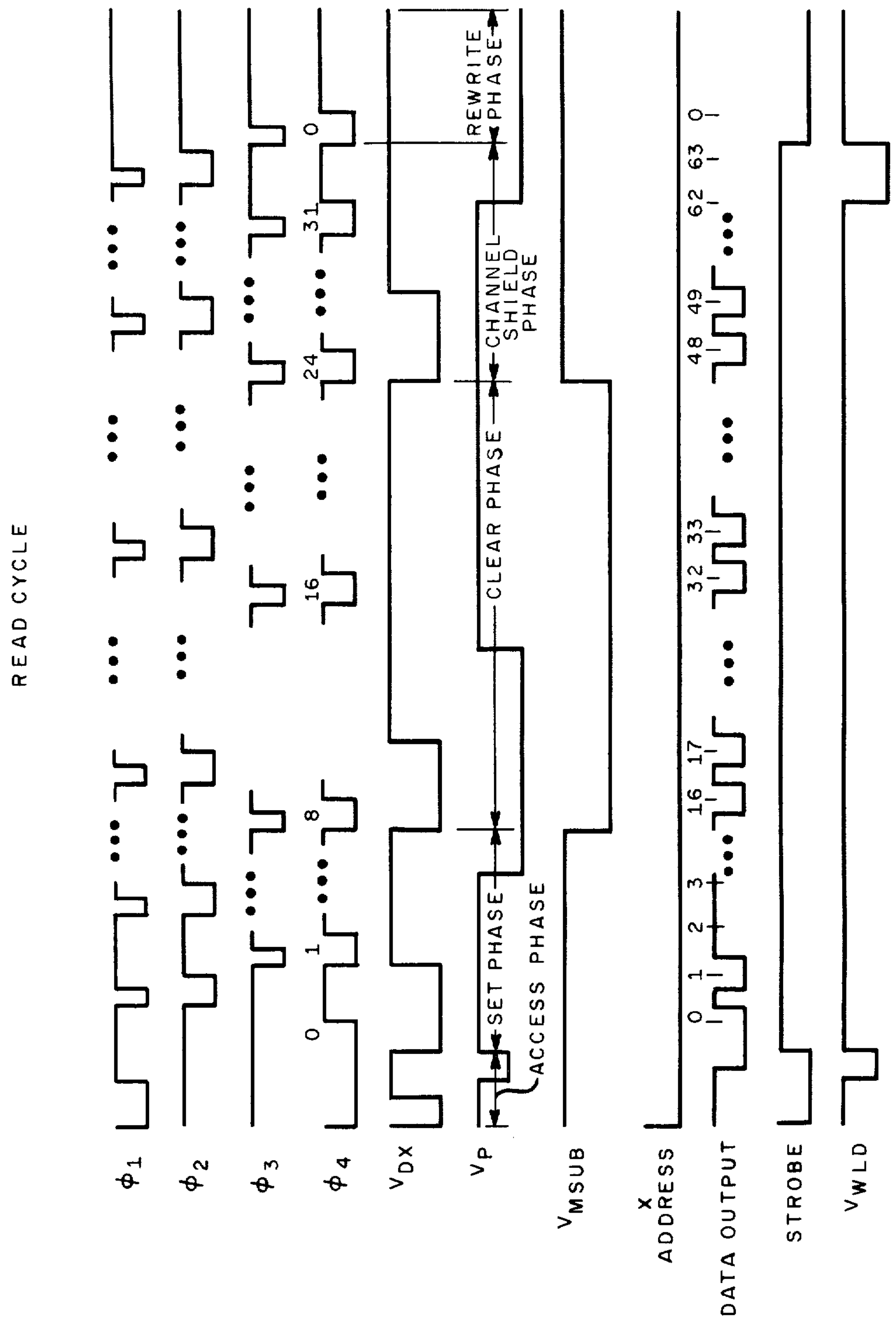
FIGS. 5 and 6 are timing diagrams illustrating the operating sequence used in practicing the invention.

The nature of the shift register can best be understood by referring to the timing diagram of FIG. 5 together with the circuit diagram of FIG. 4.

It will be noticed that each register stage contains a first transistor divider network energized by $\phi_1$ and $\phi_2$ timing pulses and a second transistor divider network energized by $\phi_3$ and $\phi_4$ timing pulses.

From the timing diagram of FIG. 5 it will be noted that during the time that binary data is being clocked through the register, the leading edges of timing pulse $\phi_1$ and $\phi_2$ are coincident and the leading edges of timing pulses $\phi_3$ and $\phi_4$ are coincident. Thus $\phi_1$ and $\phi_2$ comprise a first pair of coincident timing pulses and $\phi_3$ and $\phi_4$ comprise a pair of delayed coincident timing pulses.

Again referring to FIG. 4 it will be noticed that the first and second transistor divider networks will be energized alternately in response to the first and delayed pairs of timing pulses, respectively. It will be also noticed that data input signals are applied to the first transistor divider network of the input stage 37 during occurrence of $\phi_1$ and $\phi_2$ pulses whereas as input data is applied to the input stage 45 through a second transistor divider network during the occurrence of delayed timing pulses $\phi_3$ and $\phi_4$. Thus successive input pulses are applied to alternate input stages in a multiplex fashion so that data may be entered into the register at a rate twice that of the maximum permissible clock rate of either group of stages.

The register is switched to the READ or WRITE mode by applying high or low level command signals respectively to the READ/WRITE control circuit so as to produce direct (R/W) or inverted ($\overline{R/W}$) enabling signals.

Each input stage of the register contains a parallel input network containing a first branch enabled by an $\overline{R/W}$ signal during the READ mode so as to permit data being read out of the register to be recirculated through the feedback lines 49 and 51 respectively. Each parallel input network also contains a second branch enabled by an R/W signal during the WRITE mode so as to permit input data to be entered into the register and to inhibit information being recirculated through the feedback lines 49 and 51.

Each transistor divider network contains a data transfer line such as the line 52 in stage 37 for transferring binary data between successive divider networks. Each transfer line is coupled to the appropriate timing pulse source through a high resistance self-biased transistor such as the transistor 51 and through a transistor network including a signal responsive low resistance transistor such as the transistor 53. The data transfer line is coupled to the succeeding transistor divider network through the signal responsive transistor in that network such as the transistor 55.

In order to understand the nature of the shift register, first consider the operation of the stage 37 while data is being recirculated during a READ mode. If a high level data signal appears on the feedback line 49, the data transfer line 49 will be switched to a high voltage level approaching the magnitude of the $\phi_1$ voltage during the occurrence of the $\phi_1$ and $\phi_2$ timing pulses. This will precharge the transistor 55 so as to permit the data transfer line from the second transistor divider network to approach the voltage level of the $\phi_3$ pulse during the occurrence of the subsequent $\phi_3$ and $\phi_4$ coincident timing pulses. On the other hand, if a low level data signal were received on the feedback line 49, the data transfer line 49 would be coupled to the $\phi_1$ pulse source only through the high resistance transistor 51 and the transistor 55 would be unable to become precharged to a level sufficient to turn on this transistor during the subsequent occurrence of the $\phi_3$ and $\phi_4$ pulses. Thus binary data is transferred between successive transistor divider networks for each transition from one pair of coincident timing pulses to the next and through an entire stage for each complete cycle of timing pulses.

As can be seen from the timing diagram of FIG. 5, a complete READ cycle begins with an access phase in which binary data stored in the individual memory transistors in the addressed block is read into the corresponding stages of the shift register. During this access phase, a strobe pulse connects the register to the memory array and a word line driver pulse $V_{WLD}$ is applied to the memory transistors in the addressed block. Each of these addressed memory transistors will conduct conditionally depending upon the value of the binary data being stored in that transistor. Thus each common source line in the associated memory array will transmit either a high or low level voltage to the lines such as the lines 39 and 43 in the register so as to conditionally precharge the associated transistors to a level indicative of the stored information.

The strobe pulse terminates at the end of the access phase and thus isolates the register from the memory array. At this time, m repetitive sequences of timing pulses $\phi_1$ - $\phi_4$ are applied to the register so as to effect a readout of the stored data through the data output buffer 21. As can be seen from FIG. 4, data from the upper and lower groups of register stages selectively permit pulses of reference $V_R$ magnitude to be coupled to the data output terminal only during the occurrence of alternate $\phi_4$ and $\phi_2$ timing pulses respectively, in accordance with the multiplexing concept.

While the data is being read out of the register, it is also being recirculated. After the last bit has been read out, the register is clocked once more for half of a clock period so that the state of the register is the same as it was at the end of the access phase. When this has occurred, a second strobe pulse appears so as to reconnect the register to the memory array. This exposes the source electrodes of the individual memory transistors in the addressed block to the voltages being stored in the corresponding register stages and permits the information stored in the register to be rewritten into the memory transistor so as to overcome any destructive disturbance that might have otherwise occurred during the reading process.

During the time that information was being read out of the shift register and the register was isolated from the memory array, the memory transistors in the addressed block are subjected to an independent operating sequence which clears the memory transistors preparatory to the rewrite phase as will be explained.

Figure 6:
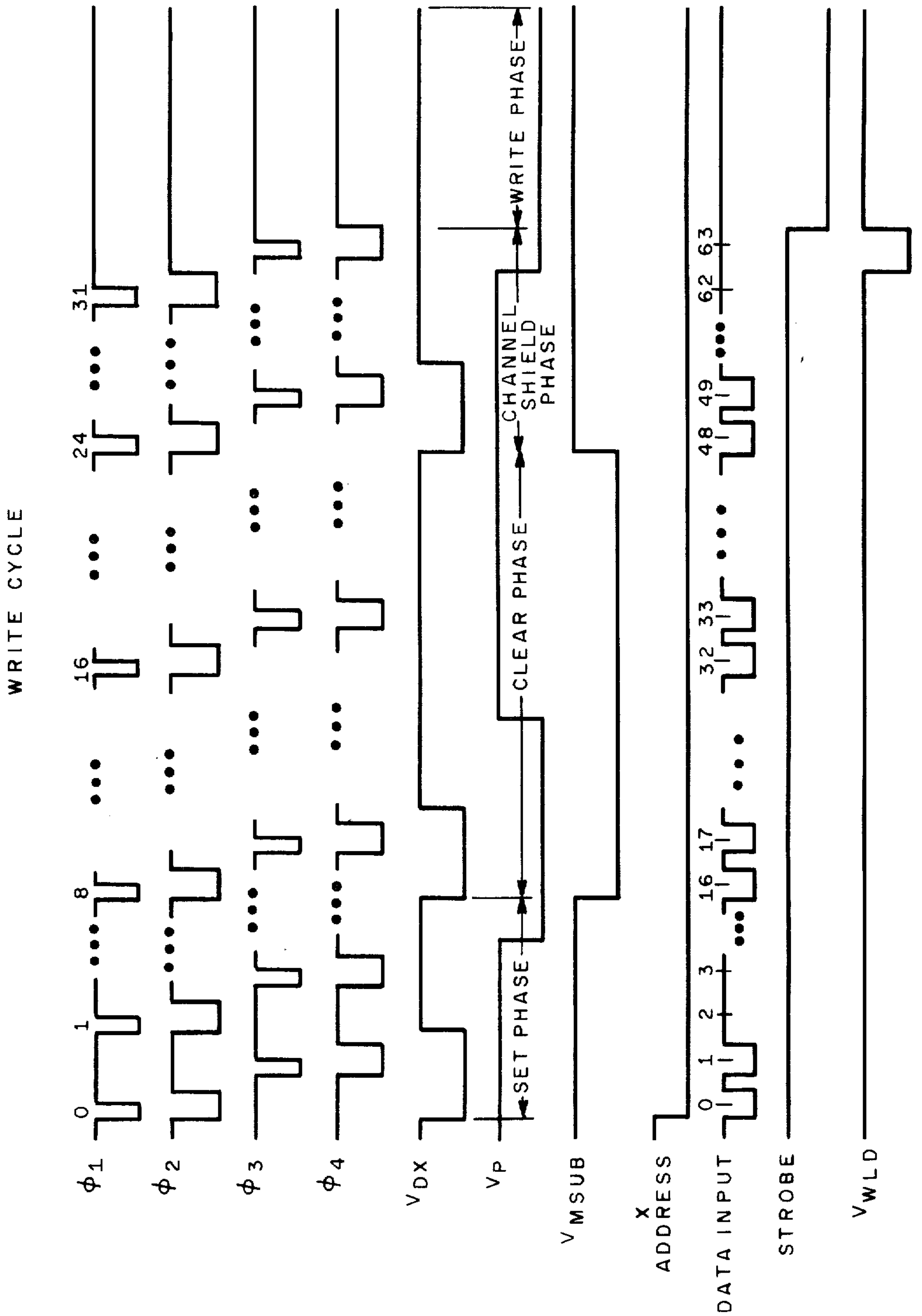

Fresh information can be written into an addressed block line in accordance with the technique depicted in FIG. 6. A WRITE cycle is initiated by applying a WRITE command signal to the READ/WRITE control circuit (FIG. 4). This prepares the second branch circuit in the parallel input networks of stages 37 and 45 for the reception of fresh data from the data input terminal and simultaneously isolates these networks from the respective feedback loops.

As in the case of the READ cycle, only 32 shift register cycles are needed to completely serially shift in all 64 words of new data because of the multiplexing feature. Again, while new data are being shifted into the register, the addressed memory cells are being subjected to a sequence which prepares these memory transistors for the eventual writing portion of the WRITE cycle. After the last bit has been shifted into the block register, a strobe pulse occurs which connects each stage in the shift register to the common source in the corresponding vertical word line so as to permit new data from the shift register to be parallel strobed into the memory transistors in the addressed block.

As has been mentioned previously, the memory transistors are subjected to a sequential operating technique during the time that the memory array is isolated and data is being clocked through the register.

Information is written into or read out of the memory transistors in accordance with the "channel shielding" technique described in U.S. Pat. No. 3,618,051 issued to Robert E. Oleksiak on Nov. 2, 1971 and assigned to the present assignee.

The application of the channel shielding technique to the present invention can be understood by referring to FIGS. 1 and 3 together with the timing diagrams of FIGS. 5 and 6.

Consider first the events occurring during a READ cycle as depicted in FIG. 5. Assume, for purposes of illustration, that block 1 has been addressed and consider particularly the events surrounding memory transistor 23 (FIG. 3). During the latter portion of the access phase, the clocked buffer voltage $V_P$ goes negative and thus drives the gate electrodes of the memory transistors in the addressed block line to a negative level. Since the substrate voltage $V_{MSUB}$ is at a zero level at this time, a negative gate-substrate voltage of READ magnitude is applied to the addressed memory transistors. At the same time a word line driver voltage $V_{WLD}$ is applied to each of the common drain lines in the memory array. Again considering in particular memory transistor 23, the drain electrode 29 will be driven negative at this time and a negative voltage of READ potential will be applied to the gate electrode 25. If the memory transistor is storing a bit of information such that its conduction threshold is at its low threshold value, the transistor will be turned on and the negative source voltage will be transferred to the source electrode 33 and thence to the common source line. Since a negative strobe voltage exists during the access phase, the common source will be coupled to the corresponding line in the shift register and the appropriate register stage will be set accordingly.

On the other hand, if the memory transistor 23 had been storing a bit of information represented by a high conduction threshold, the gate-substrate voltage would be insufficient to cause conduction in that transistor and the negative pulse applied to the source electrode 29 could not be transferred to the source electrode 33 so that the corresponding register stage would be unaffected.

The strobe pulse terminates at the end of the access phase so as to isolate the memory array.

At this time, the memory transistors in the addressed block enter the "set phase" in which all of the addressed transistors are set to their negative or high threshold values. The use of a set phase is desirable in that it sets the thresholds of all addressed memory transistors to a predetermined level and thus overcomes variations in conduction threshold setting which might have occurred as a result of previous operating cycles.

After the termination of the set phase, the addressed memory transistors enter the "clear phase" in which all of the addressed memory transistors are switched to their positive or low threshold value.

After the clear phase has terminated, the addressed memory transistors enter the "channel shield phase" during which time a negative word line decoder voltage $V_{WLD}$ is applied to all common drain lines in the memory array so as to charge these lines to a negative voltage level and thereby hold the drain electrodes of the memory transistors in the addressed block line at a correspondingly negative value.

Finally, during the "rewrite phase," information is rewritten into the addressed memory transistors from the shift register. In accordance with the channel shielding technique described in the aforementioned Oleksiak patent, the application of a gate-substrate voltage of WRITE magnitude will be insufficient to shift the conduction threshold of a memory transistor since the negative charge on the drain will prevent the entire gate-substrate voltage from appearing across the gate dielectric of the memory transistor. In order to shift the conduction threshold, this stored charge must be dissipated.

In keeping with this technique, a strobe pulse occurs during the rewrite phase so as to again connect the shift register to the memory array. If the data bit being stored in any stage of the shift register is a relatively high voltage, the drain and source lines for that particular word line are discharged thus permitting the conduction threshold of the addressed memory transistor in that word line to shift to the negative or high threshold level. Conversely, if the data bit being stored in the particular stage of the shift register is represented by a relatively low voltage, the conduction threshold of the associated memory transistor will remain at its positive or low threshold value.

During the WRITE cycle, the addressed memory transistors are subjected to the same operating sequence as can be seen in FIG. 6. In the WRITE cycle of course, there is no need for a preliminary "access phase" and the information written into the addressed memory transistors during the WRITE phase corresponds to the new information that was entered into the register during the WRITE cycle.

From the foregoing, it can be seen that the advantages of the reduction in propagation time realizable with the BORAM technique can be further enhanced by multiplexing features of the shift registers which in turn are compatible with the reduction in cost and minimization of space requirements made possible by integrated circuit techniques utilizing variable threshold insulated gate field effect memory transistors.

While the invention has been described in its preferred embodiment, it is to be understood that the words which have been used are words of description not of limitation and that changes within the purview of the appended claims may be made without departing from the true scope and spirit of the invention in its broadest aspects.

I claim:

1. A digital memory system comprising an array of variable threshold insulated gate field effect memory transistors each having source, drain and gate electrodes and being arranged in $2^n$ blocks and $m$ word columns on a common substrate.

said memory transistors being characterized in that they display a conduction threshold which may be shifted to a high or low level by the application of a negative or positive WRITE voltage respectively, across the gate insulator of said transistor, said transistors being further characterized in that information may be read out of said transistor by application of an intermediate-valued READ voltage across the gate insulator, means for producing direct or inverted enabling signals in response to received WRITE or READ command signals respectively, clocked means for applying READ and WRITE sequences of voltage pulses to components in said system, means in said clocked means for applying specified gate voltages to the memory transistors in an addressed block selected in accordance with the value of a received address signal, means in said clocked means for simultaneously applying voltage pulses to the drain electrodes of all memory transistors in said array, shift register means containing $m$ stages, each of said stages corresponding to a different one of said word columns, said stages being arranged in first and second groups so that the stages in one group correspond to alternate word columns and the stages in the other group correspond to the intermediate word columns, means for simultaneously coupling each of said stages to the source electrodes of each of the transistors in the corresponding word column in response to a STROBE pulse from said clocked means so that information may be transferred between the memory transistors in the addressed block and the corresponding stages in the shift register, each of said groups including an input stage and an output stage, said input stages including means for alternatively coupling binary input signals from a common input terminal to both input stages in response to a WRITE command signal or coupling feedback binary signals from the corresponding output stage in response to a READ command signal, said clocked means including means for producing $m/2$ repetitive sequences of timing pulses in an interval between STROBE pulses, each sequence including a first pair of coincident timing pulses and a second pair of delayed coincident timing pulses, said coupling means in the input stages of said first and second groups including means for enabling that coupling means in response to said first and to said delayed pairs of coincident timing pulses respectively, whereby successive binary input signals are coupled alternately to the input stages in said first and second groups, each of said register stages including means for transferring data from that stage to the succeeding stage in response to a single complete sequence of timing pulses, said READ sequence of voltage pulses including an access phase preceeding the occurrence of the repetitive sequences of timing pulses, said clocked means including means for producing a STROBE pulse and a voltage of READ magnitude to the addressed memory transistors during an access phase, whereby information stored in the addressed memory transistors is read into the shift register during said access phase, said clocked means also including means for producing positive and negative WRITE voltages successively to the addressed memory transistors and then a charging voltage to all memory transistors while said sequences of timing pulses are being applied to the shift register, whereby addressed memory transistors are prepared for the entry of fresh data, said clocked means still further including means to produce concurrent STROBE and negative WRITE pulses after the termination of said sequences of timing pulses so that information in the shift register may be transferred to the addressed memory transistors.

2. The memory system of claim 1 further including data output buffer means for providing output signals corresponding to information appearing in said shift register output stages, said output buffer means includes means for coupling a reference voltage to a data output terminal in response to a high level signal appearing in the output stage of said first or second group of register stages during the occurrence of a first or delayed timing pulse, respectively.

3. The memory system of claim 2 wherein each register stage includes first and second transistor divider networks energized by said first and delayed pairs of timing pulses respectively, and wherein said means for coupling a stage to the source electrode of a corresponding memory transistor includes a source coupling lead connected to the second transistor divider network in that stage and to the succeeding first transistor divider network.

4. The memory system of claim 3 wherein each transistor divider network contains a high resistance fixed bias transistor connected in series with a low resistance signal responsive transistor, each of said fixed bias and signal responsive transistors being connected to be energized by the same timing pulse, said shift register being further characterized in that adjacent transistor divider networks are coupled together through a data transfer line connected between the fixed bias and signal responsive transistors of one transistor divider network and the input terminal of the signal responsive transistor of the succeeding transistor divider network so that the voltage applied to a data transfer line by a given transistor divider network when that network is energized by a pair of coincident timing pulses determines the conductivity state of the succeeding transistor divider network during the occurrence of the following pair of coincident timing pulses.

5. The memory system of claim 4 wherein each of said drain coupling leads is connected to the same data transfer line that is connected between the fixed bias and signal responsive transistors of the first transistor divider network in the corresponding register stage, so that a voltage appearing on that data transfer line may be coupled to the source electrode of an addressed memory transistor during a WRITE phase and a voltage on the source electrode of the addressed memory transistor during a READ phase may be applied to the signal responsive transistor in the associated first transistor divider network.

6. The memory system of claim 1 wherein the words to be processed are R bit words, said system including R memory arrays and R individual shift registers corresponding to each memory array, each of said memory arrays being responsive to voltage pulses from the same clocked means and the same READ and WRITE command signals, said system being arranged so that each bit of a given word is simultaneously entered into a different one of said shift registers and so that corresponding blocks of memory transistors in each array are simultaneously addressed, whereby the individual memory transistors in corresponding portions of each memory array can store different bits of the same word and each block in a given memory array can store corresponding bits of $m$ words.

* * * * *